(12) United States Patent
Miles et al.

(10) Patent No.: US 8,576,188 B2
(45) Date of Patent: Nov. 5, 2013

(54) HAPTIC BASED USER INTERFACE FOR AN ELECTRONIC DEVICE

(75) Inventors: Matthew David Miles, Lexington, KY (US); Alan Thomas Pullins, Richmond, KY (US); Adam Randal Wiedemann, Lexington, KY (US); Hrishikesh Pramod Gogate, Charlotte, NC (US)

(73) Assignee: Lexmark International, Inc., Lexington, KY (US)

( * ) Notice: Subject to any disclaimer, the term of this patent is extended or adjusted under 35 U.S.C. 154(b) by 69 days.

(21) Appl. No.: 12/957,022

(22) Filed: Nov. 30, 2010

(65) Prior Publication Data

US 2012/0092272 A1    Apr. 19, 2012

Related U.S. Application Data

(60) Provisional application No. 61/393,252, filed on Oct. 14, 2010.

(51) Int. Cl.
*G06F 3/041* (2006.01)
*B60R 1/06* (2006.01)

(52) U.S. Cl.
USPC .......................................... 345/173; 359/508

(58) Field of Classification Search
USPC ....................................................... 361/600
See application file for complete search history.

(56) References Cited

U.S. PATENT DOCUMENTS

| | | | | |
|---|---|---|---|---|
| 7,292,227 | B2 * | 11/2007 | Fukumoto et al. | 345/173 |
| 2004/0181858 | A1 * | 9/2004 | Soto et al. | 2/448 |
| 2005/0210788 | A1 * | 9/2005 | Giles et al. | 52/309.1 |
| 2006/0181522 | A1 * | 8/2006 | Nishimura et al. | 345/177 |
| 2009/0323187 | A1 * | 12/2009 | Katsuda | 359/508 |

* cited by examiner

*Primary Examiner* — Alexander S Beck
*Assistant Examiner* — Ibrahim Khan (57) ABSTRACT

An electronics device including a haptic-based user interface, including a touch screen; an actuator coupled to the touch screen for selectively vibrating the touch screen responsive to the touch screen being depressed; and a visual display panel. The user interface further includes a plurality of suspension members disposed between the touch screen and the display panel and a plurality of seal members disposed between the suspension members such that the suspension members and the seal members define a volume between the touch panel and the visual display panel. The suspension and seal members may be formed from compressible material, such as foam materials. By separating the visual display panel from the touch panel with the suspension members in this way, vibrations from the actuator that are experienced by the visual display panel are reduced, thereby extending the useful life of the visual display panel.

24 Claims, 5 Drawing Sheets

HAPTIC BASED USER INTERFACE FOR AN ELECTRONIC DEVICE

CROSS REFERENCES TO RELATED APPLICATIONS

The present application is related to and claims benefit from U.S. patent application No. 61/393,252, filed Oct. 14, 2010, entitled "A Haptic Based User Interface for an Electronic Device," the content of which is hereby incorporated by reference herein in its entirety.

BACKGROUND

1. Technical Field

The present application relates generally to electronic devices including a user interface having a haptic-based touch screen, and particularly to such a device having a prolonged useful life.

2. Description of the Related Art

Electronic devices typically include a user interface with a touch screen in which user selections may be made by making contact with the touch screen. Some electronic devices also provide both audio and tactile feedback in addition to visual feedback as selections are made on the touch screen. Haptics is a newer technology for providing tactile feedback to a user, and in combination with audio and visual feedback creates an enhanced level of usability and customer experience.

In the electronics industry, haptic feedback is generally accomplished by vibrating a liquid crystal display (LCD) and touch panel that are rigidly mounted together as a combined pair. However, vibrations delivered to the LCD have been found to induce premature wear on the LCD, and reduce its overall life. In addition, the force required to vibrate both an LCD and a touch panel of a relatively large size necessitates the use of more expensive linear actuators.

Haptics is typically achieved through any of several different methods. Haptic events are created by using an Eccentric Rotating Mass (ERM) to vibrate the entire device, using one or more piezo strips to isolate the effect two dimensionally, or using linear actuators to vibrate an entire touch surface along a single axis. The existing approaches vibrate the touch panel and the LCD display or in some cases, such as cell phones, the entire electronic device vibrates. These existing approaches suffer from being relatively expensive and/or having other shortcomings.

In the case of the cellular phones, the haptic assembly vibrates not just the touch panel and LCD but the entire phone. Vibration will cause the LCD to fail prematurely. However, since the lifetime of a typical cell phone is short, relative to the life of a standard LCD, this is considered an acceptable tradeoff. Larger scale electronic devices do not have the luxury of such a tradeoff.

In the case of larger touch panel applications, using linear actuation is a more expensive way to implement haptics. The linear actuators are expensive, consume a relatively sizeable amount of power and require a relatively difficult assembly, all of which add to system cost. Electronic devices having larger touch panel and LCD assemblies require a larger linear actuator, thereby further increasing system cost and power consumption.

SUMMARY

Example embodiments of the present disclosure overcome at least some of the above-discussed shortcomings with existing haptic based user interfaces and thereby provide a significant need for a user interface having reduced power consumption, an extended useful life and that is less costly to manufacture. In an example embodiment, there is shown an electronics device including a haptic-based user interface, including a touch screen; an actuator coupled to the touch screen for selectively vibrating the touch screen responsive to the touch screen being depressed; and a visual display panel. The user interface further includes a plurality of suspension members disposed between the touch screen and the display panel and a plurality of seal members disposed between the suspension members such that the suspension members and the seal members define a volume between the touch panel and the visual display panel. The suspension and seal members may be formed from compressible material, such as foam materials. By separating the visual display panel from the touch panel with the suspension members in this way, vibrations from the actuator that are experienced by the visual display panel are reduced, which are believed to extend the useful life of the visual display panel.

According to an example embodiment, adjacent suspension members and seal members overlap in the longitudinal direction so as to substantially reduce or eliminate gaps between the members, which reduce the possibility of dust or other contaminants entering the volume defined between the touch panel and the visual display panel.

Additional example embodiments include the seal members being formed from multiple layers of compressible material, such as foam material, with each layer having a distinct specific gravity, density and/or compressibility.

BRIEF DESCRIPTION OF THE DRAWINGS

The above-mentioned and other features and advantages of the various embodiments, and the manner of attaining them, will become more apparent and will be better understood by reference to the accompanying drawings, wherein.

DETAILED DESCRIPTION

The following description and drawings illustrate embodiments sufficiently to enable those skilled in the art to practice it. It is to be understood that the subject matter of this application is not limited to the details of construction and the arrangement of components set forth in the following description or illustrated in the drawings. The subject matter is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present application as defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 1:
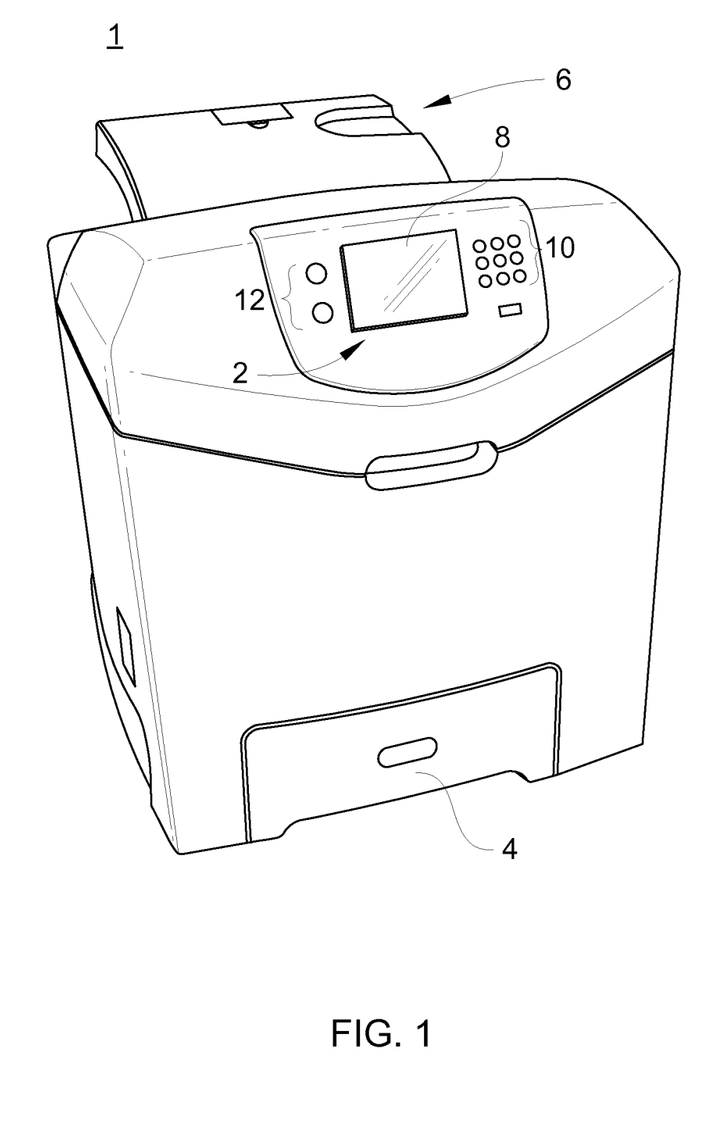
FIG. 1 is a perspective view of an electronics apparatus having a user interface with a haptic based feature according to an example embodiment of the present disclosure.

FIG. 1 illustrates an electronics apparatus 1 utilizing a touch screen based user interface 2 according to example embodiments of the present disclosure. In this example embodiment of FIG. 1, electronics apparatus 1 is a printer. It is understood, however, that electronics apparatus 1 may be virtually any device including a user interface having a touch screen. Other examples of electronics apparatus 1 may be an all-in-one imaging apparatus, a cellular telephone, an ATM machine, a personal design assistant, a kiosk, an industrial manufacturing machine, an electronics tablet or notebook, etc. When implemented as a printer, electronics apparatus 1 may include components typically found in a printing device, such as an input paper tray 4 for holding sheets of media to be printed and an output paper area 6 for maintaining printed sheets.

User interface 2 may include a touch screen 8 and visual display panel disposed beneath touch screen 8 that are sized for displaying information to a user and receiving user-selected information therefrom. For example, the visual display panel may display, through touch screen 8, a number of text characters or icons from which a user of electronics apparatus 1 may make a selection by depressing a portion of touch screen 8 corresponding to the selected character or icon. User interface 2 may also include keys forming a keypad 10 or the like, and buttons 12 to further facilitate providing user selections to electronics apparatus 1.

Figure 2:
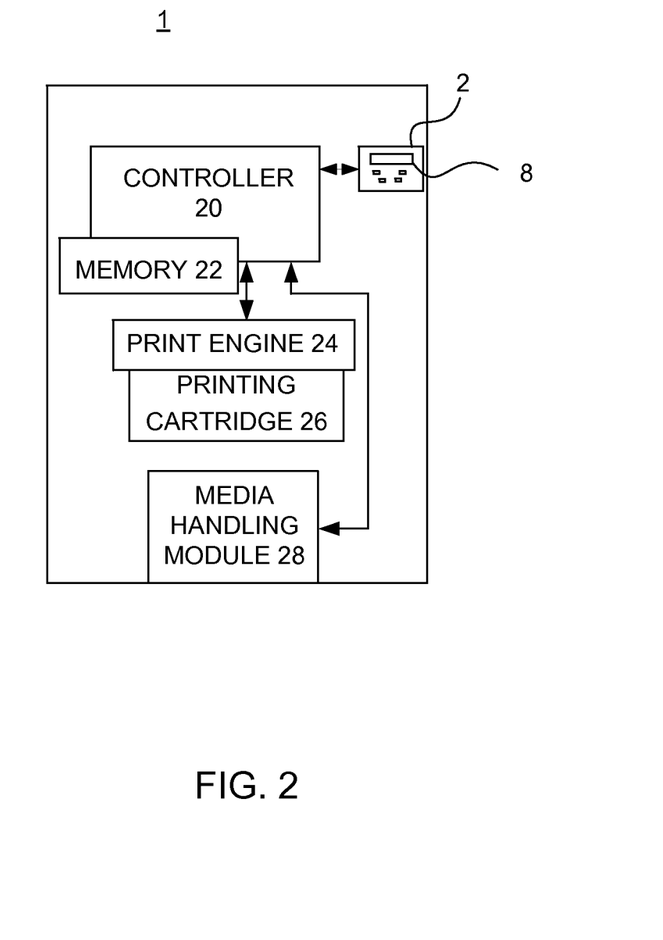
FIG. 2 is a block diagram of an implementation of the electronics apparatus of FIG. 1.

FIG. 2 illustrates components of electronics apparatus 1 when implemented as a printing device. A controller 20 may be communicatively coupled to the other components of electronics apparatus 1 for controlling such components. Controller 20 may execute firmware or software for controlling the other components, including user interface 2. The firmware or software may be stored in memory 22. Electronics apparatus 1 may further include a print engine 24 which cooperates with printing cartridge 26 for transferring an image onto a sheet of media picked from input tray 4. For example, printing cartridge 26 may be a toner cartridge or container and print engine 24 may include a laser scanning unit and at least one developer unit, photoconductive drum and transfer roll (not shown) for forming a toner image onto a sheet of media using toner stored in cartridge 26, as is known in the art. Alternatively, printing cartridge 26 may be an ink cartridge or container and print engine 24 may include a printhead for ejecting ink drawn from cartridge 26 onto a sheet of media, as is known in the art. It is understood that print engine 24 and printing cartridge 26 may include technologies other than electrophotographic and inkjet technologies for forming an image on a sheet of media. Electronics apparatus 1 may further include a media handling section 28 for picking individual sheets of media from input paper tray 4 and moving the picked sheets to print engine 24 for imparting selected images onto the sheets, as is known in the art.

In accordance with the example embodiments, user interface 2 is a haptic based interface for supplementing user selections made using touch screen 8. In particular, user interface 2 provides tactile feedback to a user via touch screen 8 to, among other things, confirm the user selection detected by touch screen 8. In this way, a user is sufficiently notified relatively soon after applying pressure to a portion of touch screen 8 so that continued and/or increased pressure is unnecessary.

Figure 3:
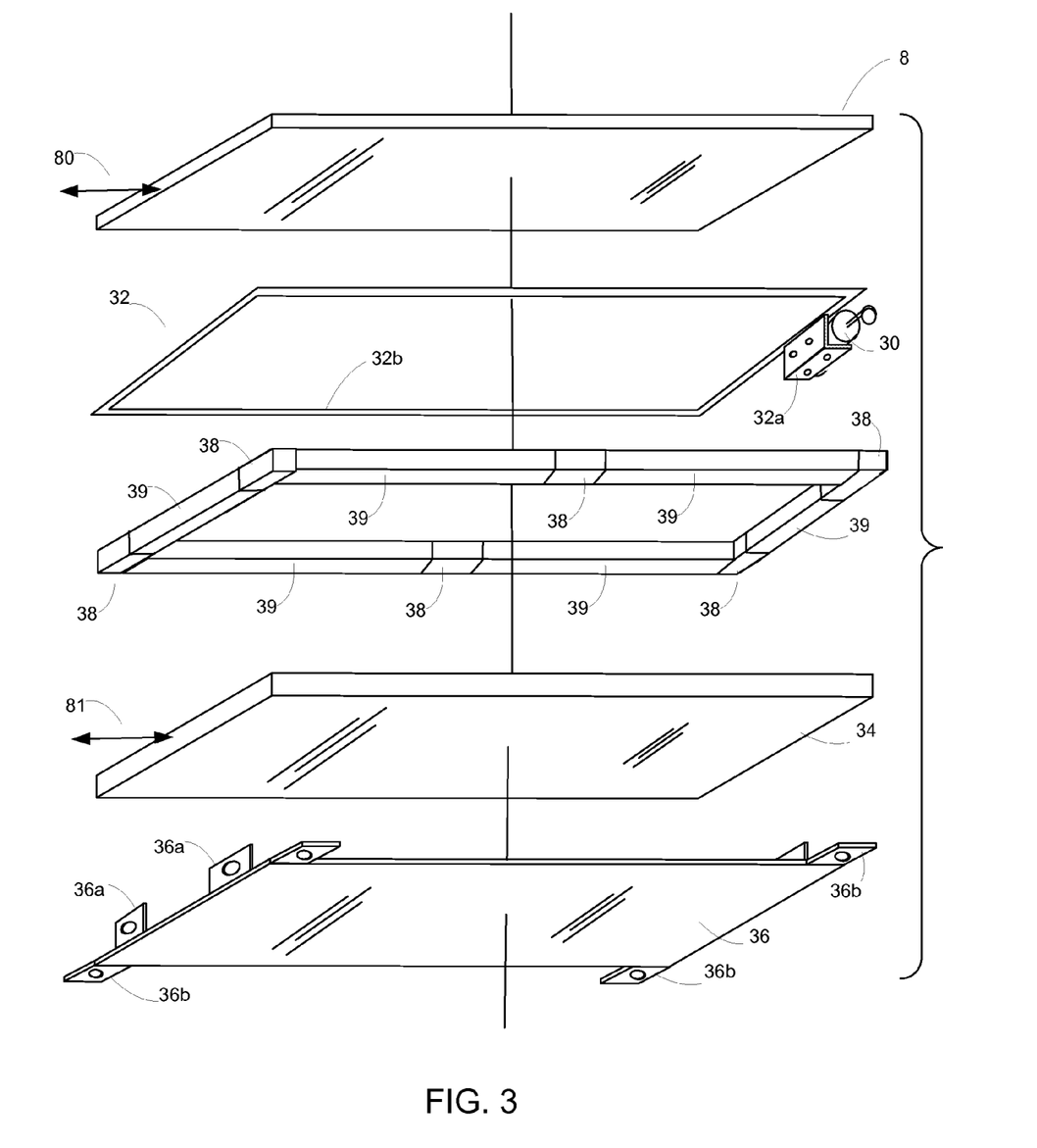
FIG. 3 is an exploded perspective view of the user interface of FIG. 1.

FIG. 3 shows the hardware assembly associated with user interface 2 according to an example embodiment. Touch screen 8 forms the outermost layer for the hardware assembly of user interface 2. Touch screen 8 may be formed from a substantially rigid material. Touch screen 8 may also be substantially transparent and/or translucent so as to allow an underlying display panel to display information to a user. Touch screen 8 may be formed from one or more layers of material, or include one or more components, for use in detecting an object contacting the screen as is known in the art. For example, touch screen 8 may be a capacitive based touch screen in which, in general terms, contact by a foreign object, such as a user's finger, causes a change in capacitance between or with respect to screen layers, such that the location of the contact along the screen may be detected. Alternatively, touch screen 8 may be a resistive based touch screen in which contact by a foreign object changes the voltage relationship between screen layers, such that the contact location may be determined. It is understood that touch screen 8 may utilize any of a number of other technologies for sensing contact by an object, including but not limited to surface acoustic wave technology and infrared and/or optical technology. Touch screen 8 may be communicatively coupled, directly or indirectly, to controller 20 for controlling a suitable response to a change in an operating characteristic of touch screen 8 due to contact by an object. For example, a ribbon cable 80 having a first end coupled to print screen 8 and a second end coupled to controller 20 may be employed.

User interface 2 further includes an actuator 30 for imparting vibratory and/or oscillatory motion to touch screen 8 to generate a tactile effect to a user touching touch screen 8. Actuator 30 may be coupled to controller 20 so that controller 20 causes actuator 30 to impart motion to touch screen 8 responsive to detection of contact with touch screen 8 by an object. In an example embodiment, actuator 30 may be an Eccentric Rotating Mass (ERM) motor and/or a motor having an offset mass. It is understood that actuator 30 may be implemented in other ways, such as using a linear actuator.

User interface 2 may further include an actuator mounting bracket 32 for mechanically coupling actuator 30 to touch screen 8 so as to impart motion thereto. Bracket 32 may be constructed from a substantially rigid material, such as a metal, and include a first portion 32a to which actuator 30 is attached and a second portion 32b which attaches to screen 8. First portion 32a may extend from second portion 32b and include at least one surface dimensioned for securing actuator 30. Actuator 30 may be secured to first portion 32a by any of a number of mechanisms, including an additional bracket (not shown) having a central portion which wraps substantially around actuator 30 and end portions which are secured to first portion 32a via screws, nuts and bolts or the like. Second portion 32b may be sized for securing along a major surface of touch screen 8. For example, second portion 32b may substantially follow the overall outer shape of the major inner surface of touch screen 8 so that second portion 32b may connect to the peripheral regions thereof. With touch screen 8 having a rectangular shape, as shown in FIG. 3, second portion 32b may include elongated members arranged in a similarly sized rectangle so as to be attached substantially along the periphery of the major (inner) surface of touch screen 8. Bracket 32, and particularly second portion 32b, may be secured to touch screen 8 using an adhesive or one or more adhesive strips. In this way, activation of actuator 30 causes actuator 30 to vibrate or otherwise move, which causes bracket 32 and touch screen 8 to similarly move.

Bracket first portion 32a may be disposed along a longitudinal side or lateral side of bracket 32. In accordance with an example embodiment, first portion 32a is disposed along the side of bracket 32 in an offset position relative to a center position. As a result, actuator 30 when activated induces a dual axis wave across touch screen 8.

The hardware assembly of user interface 2 may further include a visual display panel 34 for generating a visual display for presenting information to a user of electronics apparatus 1. Visual display panel 34 may be disposed beneath touch screen 8 and share a similar size. Visual display panel 34 may, for example, be a liquid crystal display (LCD) panel, but it is understood that visual display panel 34 may utilize other technologies in generating a visual display. Visual display panel 34 may be coupled to controller 20 or another processing component for receiving signals which, when received by visual display panel 34, may result in a visual display being generated. For example, a ribbon cable 81 may be coupled between controller 20 and visual display panel 34.

The hardware assembly of user interface 2 may also include a hardware mounting bracket 36 for securely attaching visual display panel 34 to the frame of electronics device 1. Bracket 36 may have a substantially planar portion from which a plurality of tabs 36a extend in a substantially orthogonal direction. Tabs 36a may be arranged along opposed sides of the planar portion for securing to the sides of visual display panel 34 using screws or the like. Bracket 36 may further include mounting tabs 36b for securing to the frame or other feature of electronics apparatus 1 using screws, nuts and bolts or the like.

As discussed above, prolonged use of touch screens utilizing an LCD display and haptic based feedback may lead to a shortened useable life of the LCD screen. As a result, example embodiments provide a level of isolation between the LCD display and the touch screen. According to the example embodiments, user interface 2 may further include a suspension structure disposed between visual display panel 34 and touch screen 8. As shown in FIG. 3, the suspension structure may include a plurality of suspension members 38 disposed about the periphery of visual display panel 34 and touch screen 8. Each suspension member 38 may attach to both visual display panel 34 and second bracket portion 32b so as to provide a level of decoupling between visual display panel 34 and touch screen 8. In accordance with an example embodiment, suspension members 38 may be constructed from motion absorptive or retarding material in order to reduce the motion of visual display panel 34 when actuator 30 is activated. For example, suspension members 38 may be formed from a foam material, such as microcellular urethane foam. Acceptable foams include Poron foam No. 4701-30-20093-04 by Rogers Corp. of Rogers, Conn. It is understood however, that material other than foam may be used. Suspension members 38 may have a specific gravity between about 15 lb/ ft$^3$ and about 25 lb/ ft$^3$, such as about 20 lb/ ft$^3$, for example.

By physically separating touch screen 8 and visual display panel 34 and coupling between them motion retarding suspension members 38, visual display panel 34 is sufficiently isolated from actuator 30 such that visual display panel 34 is not appreciably adversely affected thereby.

Suspension members 38 may be substantially evenly and/or uniformly distributed around the periphery of visual display panel 34. However, suspension members 38 may be disposed about the periphery of visual display panel 34 in a non-uniform manner. For instance, with actuator 30 being offset along a side of bracket 32 and touch screen 8, waves may be propagated along touch screen 8 along two axes. The waves may be then amplified by the natural harmonics of touch screen 8 such that nodes or dead spots in specific locations on touch screen 8 may occur. A non-uniform placement of suspension members 38 about touch screen 8 that is tuned to the natural harmonics thereof has been seen to substantially uniformly amplify the haptic effect waveform. This tuning creates a more uniform haptic effect across the entire surface area of touch screen 8, and substantially reduces or eliminates dead spots.

Due to the use of suspension members 38, there exists an open volume defined between touch screen 8 and visual display panel 34 following assembly of user interface 2. It has been observed that the presence of dust or other particles within such volume is not only visible but may appear at an enhanced level when electronics apparatus 1 is in use. In accordance with an example embodiment, user interface 2 may include seal members 39 disposed between suspension members 38. Seal members 39 cooperate with suspension members 38 to substantially prevent dust and other contaminants from entering the volume between touch screen 8 and visual display panel 34 following assembly.

Figure 4:
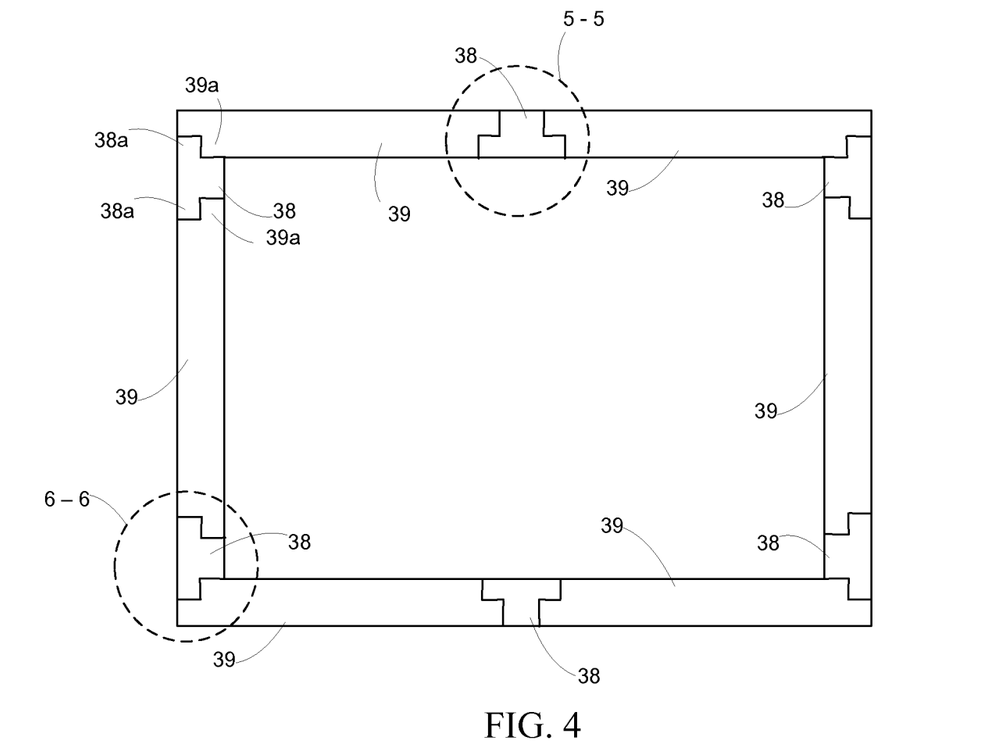
FIG. 4 is top plan view of a suspension structure of the user interface of FIG. 3.
Figure 5:
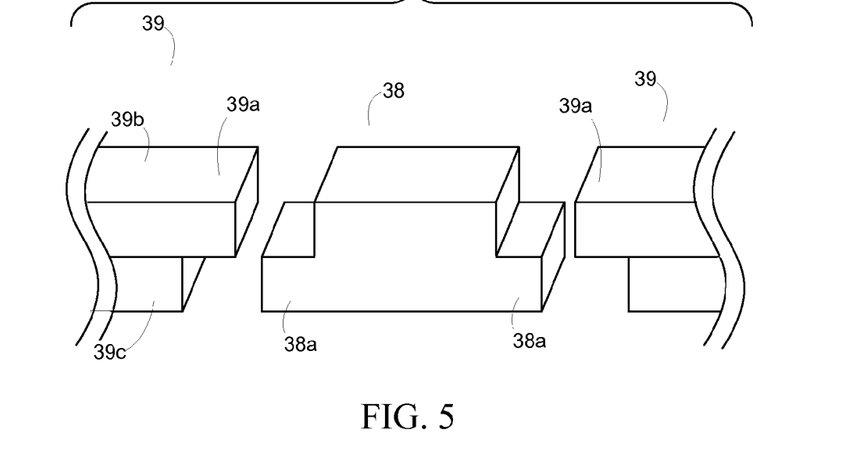
FIG. 5 is a partial exploded perspective view of the suspension structure of FIG. 4 taken along the 5-5 circle thereof.
Figure 6:
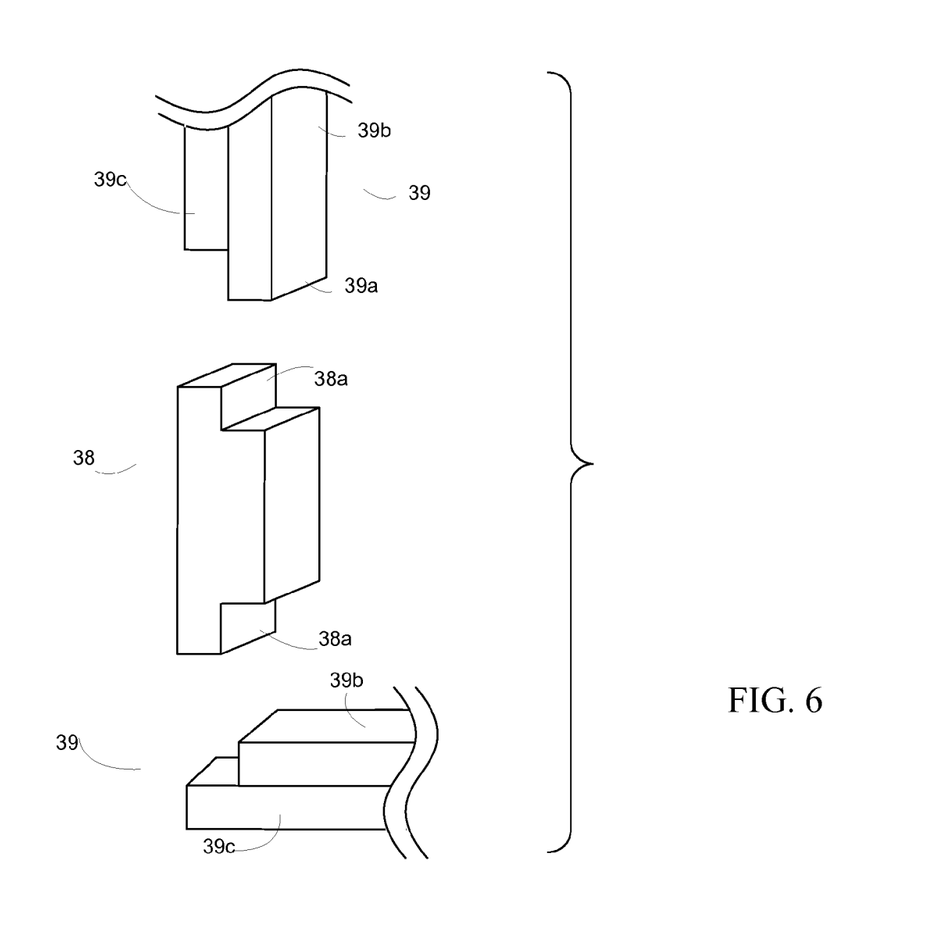
FIG. 6 is a partial exploded perspective view of the suspension structure of FIG. 4 taken along the 6-6 circle thereof.

In particular, suspension member 38 and seal members 39 are shaped so that when they are arranged end-to-end, the end portion of one member overlaps the adjacent member in a longitudinal direction. In this way, there is no visible gap between adjacent members 38 and 39. FIGS. 4-6 illustrate the shape of suspension members 38 and seal members 39. Each longitudinal end portion of a suspension member 38 includes an extension 38a. Similarly, each longitudinal end portion of a seal member 39 includes an extension 39a. Extensions 38a and 39a are dimensioned such that they allow for suspension member 38 and seal member 39 to overlap in the longitudinal direction when arranged end-to-end with little if any spacing between members 38 and 39. As a result, suspension members 38 and seal members 39 may be arranged end-to-end, to effectively form a single elongated member as shown in FIG. 5 or to form a substantially right angle as shown in FIG. 6, both substantially without gaps.

In an example embodiment, each suspension member 38 adheres to both bracket 32 (and indirectly to touch screen panel 8) and visual display panel 34, and each seal member 39 adheres to only one of bracket 32 and visual display panel 34.

Each seal member 39 may be sized to contact bracket 32 along one surface and visual display panel 34 along another surface following assembly of user interface 2. According to an example embodiment, seal members 39 are compressible so as to ensure a seal between touch screen 8 and visual display panel 34. For example, seal members may be formed from a foam material or other like material. However, while suspension members 39 formed from a single layer foam material provide a seal, the compression force has been seen to cause a dampening effect on the haptic response along touch screen 8. As a result, seal members 39 having a foam composite construction have been seen to provide a seal between visual display panel 34 and bracket 32 (and touch screen 8) with a substantially reduced dampening effect of the haptic response by touch screen 8. In accordance with an example embodiment, each seal member 39 is formed from a foam first portion 39b and a foam second portion 39c (FIGS. 5 and 6), with one portion being less compressible and/or more stiff or dense than the other portion. In an embodiment in which first portion 39b is adhered to bracket 32 using an adhesive, second portion 39c is the less dense, more compressible foam portion and is not adhered to visual display panel 34. In an embodiment in which second portion 39c is adhered to visual display panel 34, first portion 39b is the less dense, more compressible foam portion and is not adhered to bracket 32. In an example embodiment, the portion of seal member 39 formed from the denser, less compressible foam material is thicker than the other portion of seal member 39 formed from the less dense, more compressible foam material.

The thickness of seal members 39 is determined by the thickness of suspension members 38. For an effective dust seal, compression of seal members 39 is needed. For example, between about 25% and about 35% compression may be needed, such as about 30% compression. The thicker, denser foam material substantially fills the gap between touch screen 8 and visual display panel 34 while the thinner, less dense foam material provides the dust seal with high compression with a lower force. A reduced reaction force from the dust seal decreases the adhesive strength required to hold touch screen 8 in place on visual display panel 34.

As mentioned above, first portion 39b and second portion 39c may be a laminate of two different foam compositions. For example, the portion of seal member 39 made from the denser, less compressible material may be a microcellular urethane foam material such as Poron foam No. 4701-40-20062-04 from Rogers Corp. and may have a specific gravity of about 20 lb/ft$^3$. The other portion of seal member 39 made from the less dense and/or more compressible material may be a microcellular urethane foam material such as Poron foam No. 4790-92-09039-04P and may have a specific gravity of about 9 lb/ft$^3$, also from Rogers Corp. First portion 39b and second portion 39c may be substantially permanently bonded together with, for example, an acrylic, pressure sensitive adhesive tape. The height of seal members 39 may be about 2.6 mm, such as 2.57 mm, with the more compressible portion being about 1 mm.

The method of implementing haptics by substantially isolating the vibration to only the touch screen 8 as described above has a number of advantages. For instance, by isolating visual display panel 34 from a vibrating touch screen 8, the life of display panel 34 is prolonged. Use of the above-described suspension method has been seen to reduce the vibration transfer to visual display panel 34 by about 3.5 Gs. Further, by substantially isolating the visual display panel 34 from a vibrating touch screen 8, the mass of the vibration is reduced thus allowing for use of a lower cost and lower power ERM motor rather than the industry standard and more expensive linear actuators.

The foregoing description of multiple embodiments has been presented for purposes of illustration. It is not intended to be exhaustive or to limit the application to the precise forms disclosed, and obviously many modifications and variations are possible in light of the above teaching. It is understood that the subject matter of the present application may be practiced in ways other than as specifically set forth herein without departing from the scope and essential characteristics. It is intended that the scope of the application be defined by the claims appended hereto.

What is claimed is:

1. A user interface, comprising:
    a touch screen;
    an actuator coupled to the touch screen for selectively vibrating the touch screen responsive to the touch screen being depressed;
    a visual display panel;
    a plurality of suspension members disposed between the touch screen and the visual display panel; and
    a plurality of seal members disposed between the suspension members such that the suspension members and the seal members define a volume between the touch screen and the visual display panel,
    wherein each seal member comprises a first portion and a second portion arranged one on top of the other in a direction from the touch screen to the visual display panel, the first and second portions formed from one or more compressible materials, the first portion being more compressible than the second portion.

2. The user interface of claim 1, wherein the volume is substantially sealed.

3. The user interface of claim 1, wherein the suspension members are compressible, each suspension member being attached along one surface to the touch screen and along a second surface to the visual display panel.

4. The user interface of claim 1, wherein for each seal member, the first portion and the second portion comprise a first foam portion and a second foam portion, respectively, the first foam portion being less dense than the second foam portion.

5. The user interface of claim 1, wherein each suspension member is adhered to the touch screen and the visual display panel.

6. The user interface of claim 1, wherein each seal member is adhered to only one of the touch screen and the visual display panel.

7. The user interface of claim 1, wherein the touch screen includes a surface having a plurality of edges, each edge being attached to at least one suspension member.

8. The user interface of claim 1, wherein the suspension members and seal members are arranged around a periphery of the touch screen and the visual display panel, adjacent suspension members and seal members overlapping each other in a direction from an outer edge of the touch screen and the visual display panel to a center thereof, so that the peripheral arrangement provides no visible space between adjacent suspension and seal members.

9. The user interface of claim 1, further comprising a mounting bracket secured to the visual display panel and having attachment mechanisms for securing the visual display panel within an electronics apparatus in a substantially fixed position.

10. The user interface of claim 1, wherein the suspension members and the seal members are constructed from one or more foam materials.

11. The user interface of claim 1, wherein for each seal member, the specific gravity of the first portion is about one-half the specific gravity of the second portion.

12. The user interface of claim 1, wherein for each seal member, a height of the first portion is about two-thirds of a height of the second portion.

13. The user interface of claim 1, wherein each suspension member has a substantially T-shaped surface facing the visual display panel.

14. The user interface of claim 1, wherein the first and second portions of each seal member are stacked directly on top of each other in the direction from the touch screen to the visual display panel.

15. An electronics apparatus, comprising:
    a user interface, including:
        a touch screen;
        an actuator coupled to the touch screen for selectively vibrating the touch screen;

a visual display panel;

a plurality of suspension members disposed between the touch screen and the visual display panel for providing a spaced relationship between the visual display panel and the touch screen; and a plurality of seal members disposed between the suspension members such that the suspension members and the seal members define a volume between the touch screen and the visual display panel, wherein the seal members comprise compressible seal members, each seal member having a first portion and a second portion having a different compressibility than the first portion, the first and second portions being disposed in a stacked arrangement in a direction from the touch screen to the visual display panel.

16. The electronics apparatus of claim 15, wherein the suspension members and the seal members substantially shield the volume from dust.

17. The electronics apparatus of claim 15, wherein the suspension members comprise compressible suspension members disposed about a periphery of the touch screen and the visual display panel.

18. The electronics apparatus of claim 15, wherein for each compressible seal member, the first portion is more compressible than the second portion.

19. The electronics apparatus of claim 15, wherein each seal member is adhered to only one of the touch screen and the visual display panel, and each suspension member is adhered to the touch screen and the visual display panel.

20. The electronics apparatus of claim 15, further comprising a frame, wherein the visual display panel is secured to the frame in a substantially fixed position.

21. The electronics apparatus of claim 15, wherein the suspension members and the seal members are constructed from one or more foam materials.

22. The electronics apparatus of claim 15, wherein for each seal member, the specific gravity of the first portion is about one-half the specific gravity of the second portion.

23. The electronics apparatus of claim 15, wherein for each seal member, the height of the first portion is about two-thirds the height of the second portion.

24. The electronics apparatus of claim 15, wherein each suspension member has a substantially T-shaped surface facing the visual display panel.

\* \* \* \* \*